(12) United States Patent
Yamamoto

(10) Patent No.: US 7,950,404 B2
(45) Date of Patent: May 31, 2011

(54) METHOD OF REMOVING SURFACE MATERIAL FROM RESIN PRODUCT AND APPARATUS THEREFOR

(75) Inventor: Hiroshi Yamamoto, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 1405 days.

(21) Appl. No.: 11/441,809

(22) Filed: May 26, 2006

(65) Prior Publication Data

US 2006/0289684 A1    Dec. 28, 2006

(30) Foreign Application Priority Data

May 27, 2005   (JP) ................... 2005-155548

(51) Int. Cl.
*B08B 3/00* (2006.01)
*B08B 7/00* (2006.01)
*B02B 1/08* (2006.01)
*B02B 3/06* (2006.01)
*B02C 19/22* (2006.01)
*B02C 25/00* (2006.01)

(52) U.S. Cl. .............. 134/132; 134/38; 241/30; 241/65; 241/260.1

(58) Field of Classification Search .............. 134/132, 134/38; 241/30, 65, 260.1
See application file for complete search history.

(56) References Cited

U.S. PATENT DOCUMENTS

| | | | | |
|---|---|---|---|---|
| 4,051,212 A | * | 9/1977 | Grigat et al. ................. 264/102 |
| 5,458,829 A | * | 10/1995 | Ikeda et al. ................... 264/83 |
| 6,672,523 B2 | * | 1/2004 | Yamamoto ..................... 241/30 |
| 6,702,211 B2 | * | 3/2004 | Yamamoto ..................... 241/65 |
| 2003/0094188 A1 | * | 5/2003 | Urabe et al. .................. 134/132 |
| 2004/0195411 A1 | * | 10/2004 | Imai et al. .................. 241/101.2 |

FOREIGN PATENT DOCUMENTS

| | | |
|---|---|---|
| JP | 05-337941 | 12/1993 |
| JP | 06-106535 | 4/1994 |
| JP | 07-232326 | 9/1995 |
| JP | 2002-321218 | 11/2002 |
| JP | 2002321218 A * | 11/2002 |
| JP | 2005-096270 | 4/2005 |

OTHER PUBLICATIONS

JP 2002-321218 Machine Translation.*
JP 2002-321218 Machine Translation; Yamamoto; Nov. 2002.*

* cited by examiner

*Primary Examiner* — Michael Barr
*Assistant Examiner* — Charles W Kling
(74) *Attorney, Agent, or Firm* — Smith, Gambrell & Russell LLP

(57) ABSTRACT

A method of removing a surface material from a resin product including: coarsely crushing the resin product having a resin substrate and the surface material formed thereon by coating or adhesive bonding, introducing the coarsely crushed product into a cylinder, and transporting the coarsely crushed product in the cylinder while bringing the product into contact with heated steam and stirring the product by a rotor having a protruding bar, to peel the surface material from the product. The heat of the heated steam and the rubbing heat by the stirring reduce the bonding strength between the surface material and the resin substrate to easily peel the surface material from the product by rubbing the product with each other. Thus, the removal of the surface material formed on a surface of a resin substrate by coating or adhesive bonding can be achieved with enhanced efficiency, environment safety and processing capacity.

8 Claims, 16 Drawing Sheets

(a)

(b)

METHOD OF REMOVING SURFACE MATERIAL FROM RESIN PRODUCT AND APPARATUS THEREFOR

CROSS REFERENCE TO RELATED APPLICATIONS AND INCORPORATION BY REFERENCE

This application based upon and claims the benefit of priority from the prior Japanese Patent Application No. 2005-155548, filed on May 27, 2005; the entire content of which is incorporated herein by reference.

BACKGROUND OF THE INVENTION

1. Field of the Invention

The present invention relates to a method of removing a surface material from a resin product having a resin substrate and the surface material formed thereon by means of coating or adhesive bonding, and an apparatus for removing the surface material.

2. Description of the Related Art

Recently, the recycling of resin products has been demanded from the viewpoints of environmental protection or resource recovery. For instance, it is noted that defective goods generated during a manufacture of bumpers or side moldings in the field of automobile industry, and resin products separately collected from scrap cars are recycled.

Most of such resin products have a structure that a paint film is coated on a resin substrate or that a different resin material is bonded onto the resin substrate, in order to improve the appearance or quality. For instance, in a resin bumper, a paint film 103 is generally formed on a surface of a resin substrate 101 through a primer layer 102 as shown in FIG. 17 illustrating a section view of the important part.

The substrate 101 is, for example, composed of materials obtained by mixing polypropylene of thermoplastic synthetic resin as a base resin, ethylene propylene rubber and talc as a filler, and the substrate 101 has a specific gravity of 0.91 to 0.98 and a thickness "t" of approx. 2 to 4 mm.

The primer layer 102 is an adhesive layer having a specific gravity of approx. 1.7 and a thickness of 10 μm and serving to strengthen the bonding strength between the substrate 101 and the paint film 103. The primer layer 102 is formed by application of a paint comprising melamine or urethane thermosetting resin as material.

In case bumpers made of resin subjected to the application processing are crushed to give pellet-shaped recycle materials, the pellet-shaped recycle materials include the above-mentioned polypropylene system resin materials constituting the resin substrate 101 and further paint chips such as the primer layer and the paint film. Therefore, when the polypropylene system resin materials containing the paint chips are subjected to a molding processing, the paint chips inhibit the liquidation of the resin materials, whereby the resultant molded product suffers from defective molding processing and shows poor appearance because of the paint chips floated on the surface of the resultant molded product. Further since there is little compatibility between the paint chips and the polypropylene system resin materials, the kneading of the paint chips and the polypropylene system resin materials does not brings about the integration of them to reduce mechanical properties of the resultant molded product.

For the reason, when the resin product subjected to the application processing is recycled, it is needed to remove the paint film from the resin product.

The method of removing a paint film is roughly divided into mechanically, physically and chemically methods. Examples of the method of removing mechanically the paint film include a shot-blast method comprising blowing down microparticulate abrasive material onto a paint film formed on a resin product using compressed air to destroy and remove the paint film or other attachment, and a screen-mesh method comprising crushing finely the resin product, fusing the product and then filtrating the fused product through a screen-mesh to remove paint film chips that are not fused and contained in the product.

The shot-blast method is excellent in view of toxicity and environmental safety because of removal of the paint film by friction and impact, whereas there are disadvantages of long processing time period, insufficient efficiency for removal of a paint film and especially difficulty in processing of a curved portion of the product. The screen-mesh method is excellent in view of toxicity and environmental safety because of removal of paint chips by filtration, but when the screen-mesh is clogged, the throughput is reduced owing to significant increase of the depressing pressure to decrease the productivity and simultaneously not to bring about sufficient removal efficiency of the paint chips, and therefore it is necessary to exchange the screen-mesh in order to avoid reduction of the production efficiency owing to clogging of the screen-mesh.

Example of the method of removing physically a paint film include a method of removing the paint film by utilizing solvent penetration phenomenon into an interface between a paint film and a substrate and a paint film and swelling phenomenon of a solvent into a paint film. The solvent includes various organic solvents including halogen-containing solvents. However, the method has disadvantages of poor environment safety due to necessity of treatment of waste liquid and relatively reduced efficiency of removing the paint film and capacity of processing it, which may deteriorate even a substrate supporting the paint film.

These methods for removing mechanically or physically a paint film show reduced efficiency of removing the paint film, and therefore the use of the resultant resin material recycled by these methods increases the production cost to bring about limitation of the application.

Example of the method of removing chemically a paint film include an organic salt method comprising breaking ether bonds in the vicinity of crosslinked structure of paint film resin using, for example, an ethanol/water mixed liquid containing an organic salt to chemically decompose the paint film and remove it.

The above-mentioned chemical method has a disadvantage in a secondary treatment such as waste liquid treatment and shows reduced processing capacity, and hence the method is not preferred in view of processing efficiency.

Further, in an example of a conventional apparatus for removing a surface material (paint film) of a synthetic resin product, a paint film is placed between a pair of rotating bodies, and cut and rubbed by the rotating bodies to peel the paint film, which is described in, for example, JA5-337941.

The conventional removing apparatus is shown in FIG. 18 illustrating its plan view, and in FIG. 19 illustrating its section view taken in I-I line. A resin product such as side molding 122 is transported between rotating bodies 123, 124 composed, for example, of synthetic resin foam by a pair of transport rollers 121 whereas a velocity "V" transporting the side molding 122 is set to be lower than a rotating velocity of the rotating bodies 123, 124. Hence, cutting and high rubbing force are applied to a paint film 122a and a double faced adhesive tape 122b to cut and peel the paint film 122a and the double faced adhesive tape 122b from the surface of the side molding 122 and simultaneously to discharge the side molding 122 outward by the pair of transport rollers 121.

In this apparatus, the resin product is brought into contact with the rotating bodies 123, 124 composed of synthetic resin foam, and hence the rotating bodies 123, 124 is subjected to brittle failure to generate powder dust, which brings about undesirable work environment. Further this apparatus is not suitable for peeling of a paint film of a resin product in the bent and curved form.

The above-mentioned problems can be applied to removal of a surface material made of different kind of resin adhesive-bonded to a surface of a resin substrate.

SUMMARY OF THE INVENTION

In view of the above-mentioned problems, a first object of the present invention is to provide a method of removing a surface material from a resin product by which the removal of the surface material formed on a resin substrate by coating or adhesive bonding can be carried out in enhanced efficiency, environment safety and processing capacity and a recycled product having high quality can be obtained.

Further, a second object of the present invention is to provide an apparatus for removing a surface material from a resin product which enables the above-mentioned method to perform easily and inexpensively.

The present first invention to attain the first object is provided by a method of removing a surface material from a resin product comprising:
 a step for coarsely crushing the resin product having a resin substrate and the surface material formed thereon by means of coating or adhesive bonding to prepare a coarsely crushed product,
 a step for introducing the coarsely crushed product into a cylinder, and
 a step for transporting the coarsely crushed product in the cylinder while bringing the product into contact with heated steam and stirring the product by a rotor having a protruding bar provided thereon, to peel the surface material from the resin product.

The first preferred mode of the first invention lies in the method of the first invention wherein the coarsely crushed product is pressurized in a partial area inside of the cylinder.

The second preferred mode of the first invention lies in the method of the first preferred mode wherein the contact with the heated steam is further carried out in the transporting step and/or the stirring step, excluding the pressurizing step of the coarsely crushed product.

The third preferred mode of the first invention lies in the method of the first invention or first or second preferred mode wherein the contact with the heated steam is carried out by heating an inner surface of the cylinder and feeding a liquid into the cylinder to vaporize the liquid to bring the liquid into contact with the coarsely crushed product.

The fourth preferred mode of the first invention lies in the method of the first invention or first, second or third preferred mode wherein an abrasive material is mixed with the coarsely crushed product.

The present second invention to attain the second object is provided by an apparatus for removing a surface material from a resin product having a resin substrate and the surface material formed thereon by means of coating or adhesive bonding, the apparatus comprising:
 a cylinder part having on one end side thereof an inlet for introduction of a charging material consisting of the coarsely crushed product or a mixture of the coarsely crushed product and an abrasive material, and on the other end side of the cylinder an outlet for discharging the charging material, the cylinder being extended horizontally,
 a rotor rotatably inserted into a cylinder of the cylinder part and transporting the charging material from the inlet to the outlet while stirring, the rotor having a protruding bar on an outer periphery thereof,
 a driving part for rotating the rotor, and
 a steam feeding part for bringing the charging material into contact with heated steam.

The first preferred mode of the second invention lies in the apparatus of the second invention, wherein the steam feeding part comprises:
 a means for generating a heated steam,
 a steam feed opening formed on the cylinder, and
 a connecting tube for connecting between the means for generating heated steam and the steam feed opening,
 wherein the heated steam generated by the heated-steam generating means is fed into the cylinder through the connecting tube and the steam feed opening to be brought into contact with the charging material.

The second preferred mode of the second invention lies in the apparatus of the second invention or the first preferred mode, wherein the steam feeding part comprises:
 a means for heating the cylinder, and
 a means for feeding a liquid into the cylinder,
 wherein the liquid fed from the liquid-feeding means is vaporized on an inner surface of the cylinder heated by the cylinder-heating means to be brought into contact with the charging material.

The third preferred mode of the second invention lies in the apparatus of the second invention, or the first or second preferred mode, further comprising a large number of openings formed on a bottom portion of the cylinder and having a diameter smaller than that of the charging material.

The fourth preferred mode of the second invention lies in the apparatus of the second invention or the first, second or third preferred mode, wherein the rotor comprises:
 a transporting helical protruding bar part having a transporting helical protruding bar for transporting the charging material from the inlet for the introduction to a side of the outlet,
 a backing-up helical protruding bar part having a backing-up helical protruding bar for backing up the charging material to a side of the inlet by a backward transporting force less than a transporting force of the transporting helical protruding bar, and
 a stirring protruding bar part having a stirring protruding bar for stirring the charging material while scarcely transporting the charging material.

The fifth preferred mode of the second invention lies in the apparatus of fourth preferred mode, further comprising a means for cooling the cylinder part corresponding to a position of the backing-up helical protruding bar part and the stirring protruding bar part.

The sixth preferred mode of the second invention lies in the apparatus of fourth preferred mode, wherein the rotor is provided with the transporting helical protruding bar part, the backing-up helical protruding bar part and the stirring protruding bar part, such that a plurality of each of the parts are provided in an axis direction of the cylinder.

According to the first invention, the coarsely crushed product of the resin product is transported while bringing the product into contact with a heated steam in the cylinder and stirring the product by a rotor having a protruding bar provided thereon, and, as a result, the heat of the heated steam and the rubbing heat by the stirring reduce the bonding strength between the surface material and the resin substrate, and therefore the surface material can be easily peeled from the resin product by rubbing the product with each other. Thus, even when chemicals such as organic salts or solvents are not used, and the secondary treatment such as wastewater processing is not performed, the above easy steps that the resin product is coarsely crushed and the coarsely crushed product is transported in the cylinder while bringing the product into contact with a heated steam and stirring the product enables enhancement of efficiency, environment safety and processing capacity in the steps for removing the surface material.

According to the first preferred mode of the first invention, the coarsely crushed product is rubbed with each other (i.e., kneaded) under application of pressure in a partial area inside of the cylinder to promote peeling of the surface material from the coarsely crushed product (to leave the resin substrate), whereby efficiency of removing the surface material can be enhanced.

According to the second preferred mode of the first invention, the coarsely crushed product can be further brought into contact with heated steam in the transporting step and/or the stirring step to enable the heated steam to contact the whole crushed product, whereby efficiency of removing the surface material can be enhanced.

According to the third preferred mode of the first invention, the heated steam is generated on an inner surface of the cylinder to be brought efficiently into contact with the coarsely crushed product, whereby efficiency of removing the surface material can be enhanced.

According to the fourth preferred mode of the first invention, the coarsely crushed product is kneaded or rubbed with the abrasive material to promote peeling of the surface material from the coarsely crushed product (to leave the resin substrate), whereby efficiency of removing the surface material can be enhanced.

According to the second invention, the charging material such as the resin product is transported by the rotation of the cylinder while bringing the product into contact with a heated steam in the cylinder and stirring the product by a rotor having a protruding bar provided thereon, and, as a result, the heat of the heated steam and the rubbing heat by the stirring easily reduce the bonding strength between the surface material and the resin substrate. Thus, even when chemicals such as organic salts or solvents are not used, and the secondary treatment such as wastewater processing is not performed, the surface material can be surely peeled from the coarsely crushed product of the resin product (to leave the resin substrate). Thus, in the removal of the surface material, efficiency, environment safety and processing capacity can be enhanced. Further, for example, any parts of an existing extruder can be utilized as the cylinder part, the rotor or the driving part, and therefore the apparatus can be easily and inexpensively constructed.

According to the first preferred mode of the second invention, the heated steam generated by the heated-steam generating means can be fed into the cylinder through the connecting tube and the steam feed opening to enable easy construction of the cylinder part.

According to the second preferred mode of the second invention, the heated steam is generated on an inner surface of the cylinder and therefore the heated steam can be efficiently brought into contact with the charging material to surely reduce the bonding strength between the surface material and the resin substrate, whereby the efficiency for removing the surface material can be enhanced.

According to the third preferred mode of the second invention, the charging material is in contact with end portions of a large number of openings to enhance the stirring effect and the rubbing effect of the surface material, and therefore with the cooperation of the contact with the heated steam, the efficiency for removing the surface material can be further enhanced. Moreover, a part of the surface material peeled in the cylinder can be passed and dropped through the many openings, and hence the discharge extruded from the outlet is easily separated into the resin substrate and the surface material.

According to the fourth preferred mode of the second invention, the charging material is transported to the inlet side by a transporting force in the backward direction in the area of the backing-up helical protruding bar part for backing up the charging material, and therefore the charging material is surely rubbed with each other by receiving the pressure, while the charging material is stirred and rubbed with each other with being scarcely transported in the area of the stirring protruding bar part. Thus, with the cooperation of the contact with the heated steam, the efficiency for removing the surface material can be further enhanced.

According to the fifth preferred mode of the second invention, the cylinder part corresponding to the position of the backing-up helical protruding bar part and the stirring protruding bar part is cooled, and this cooling prevents the charging material from fusing (melting) owing to the heat generated by the rubbing of the charging material and by the contact with the heated steam. Thus, the surface material can be surely peeled from the resin product.

According to the sixth preferred mode of the second invention, the charging material is repeatedly rubbed with each other by stirring under pressure, and hence, with the cooperation of the contact with the heated steam, the surface material can be further efficiently removed.

DETAILED DESCRIPTION OF THE INVENTION

Embodiments of the method of removing a surface material from a resin product and an apparatus for removing the surface material according to the invention are explained by reference of drawings.

First Embodiment of the Invention

Figure 1:
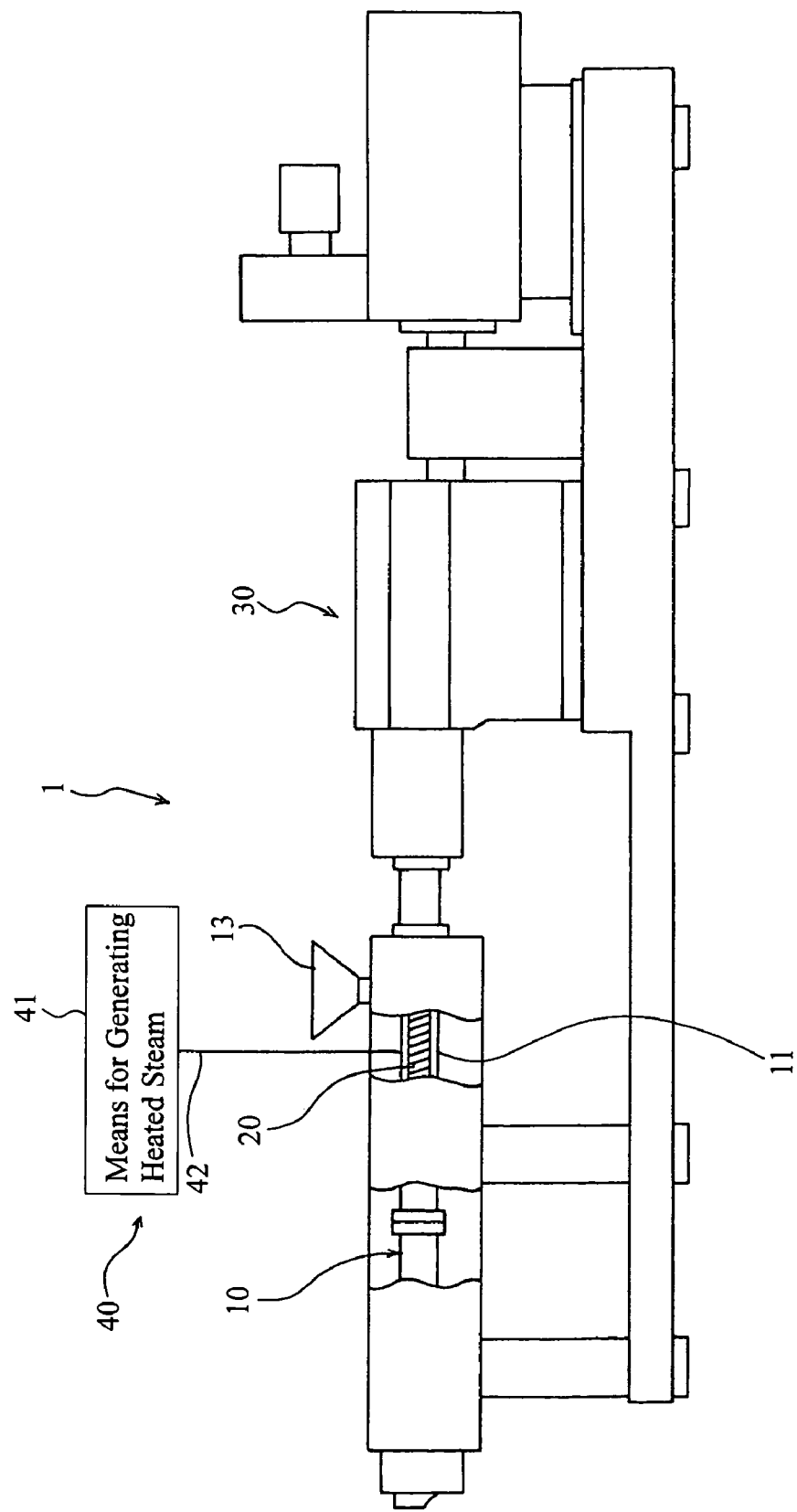
FIG. 1 is a view for illustrating a whole apparatus for removing a surface material from a coated resin product according to a first embodiment of the invention, of which a part is lacked.
Figure 2:
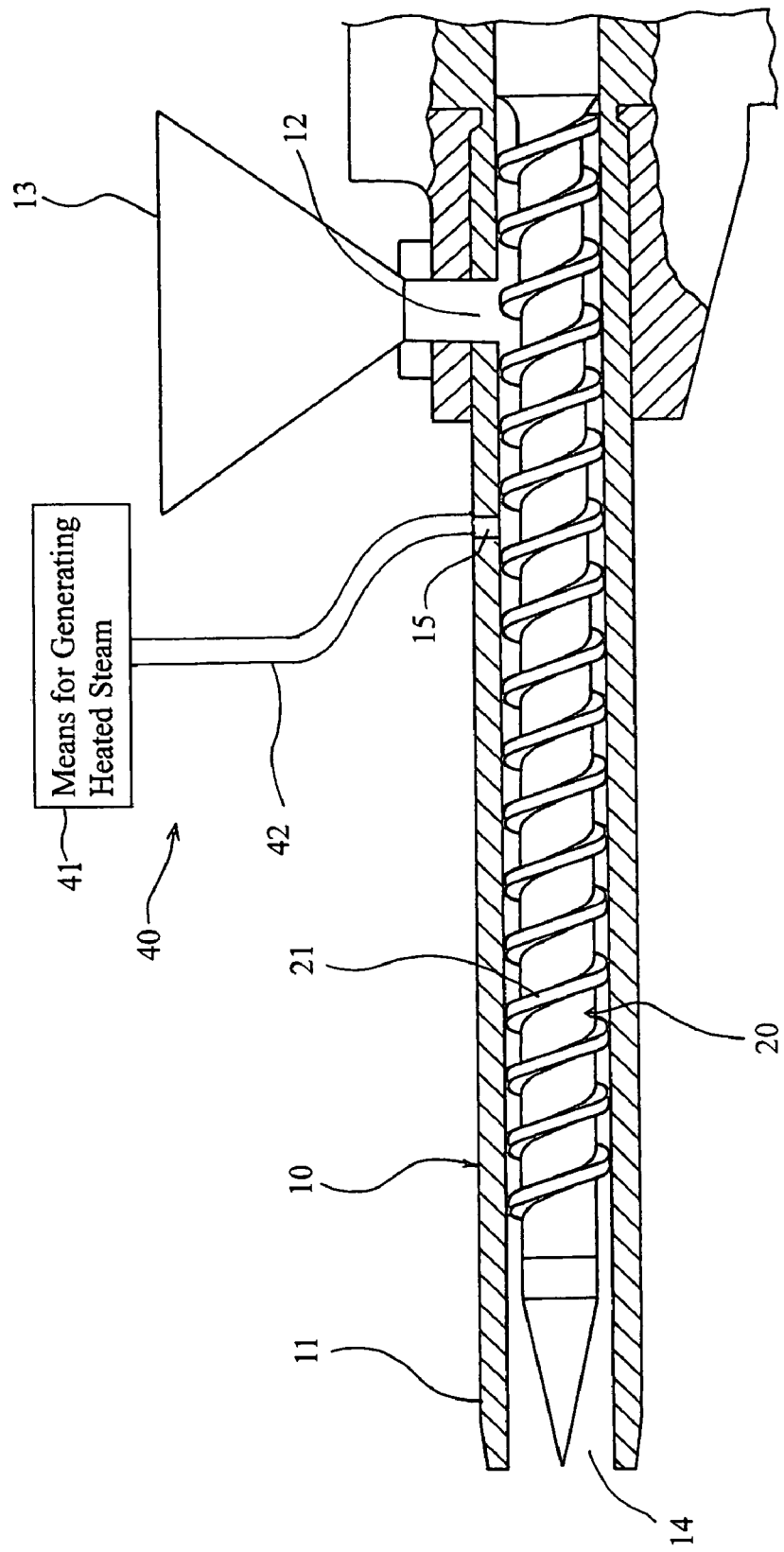
FIG. 2 is a section view for illustrating the detailed structures of a cylinder part and a rotor of FIG. 1.
Figure 3:
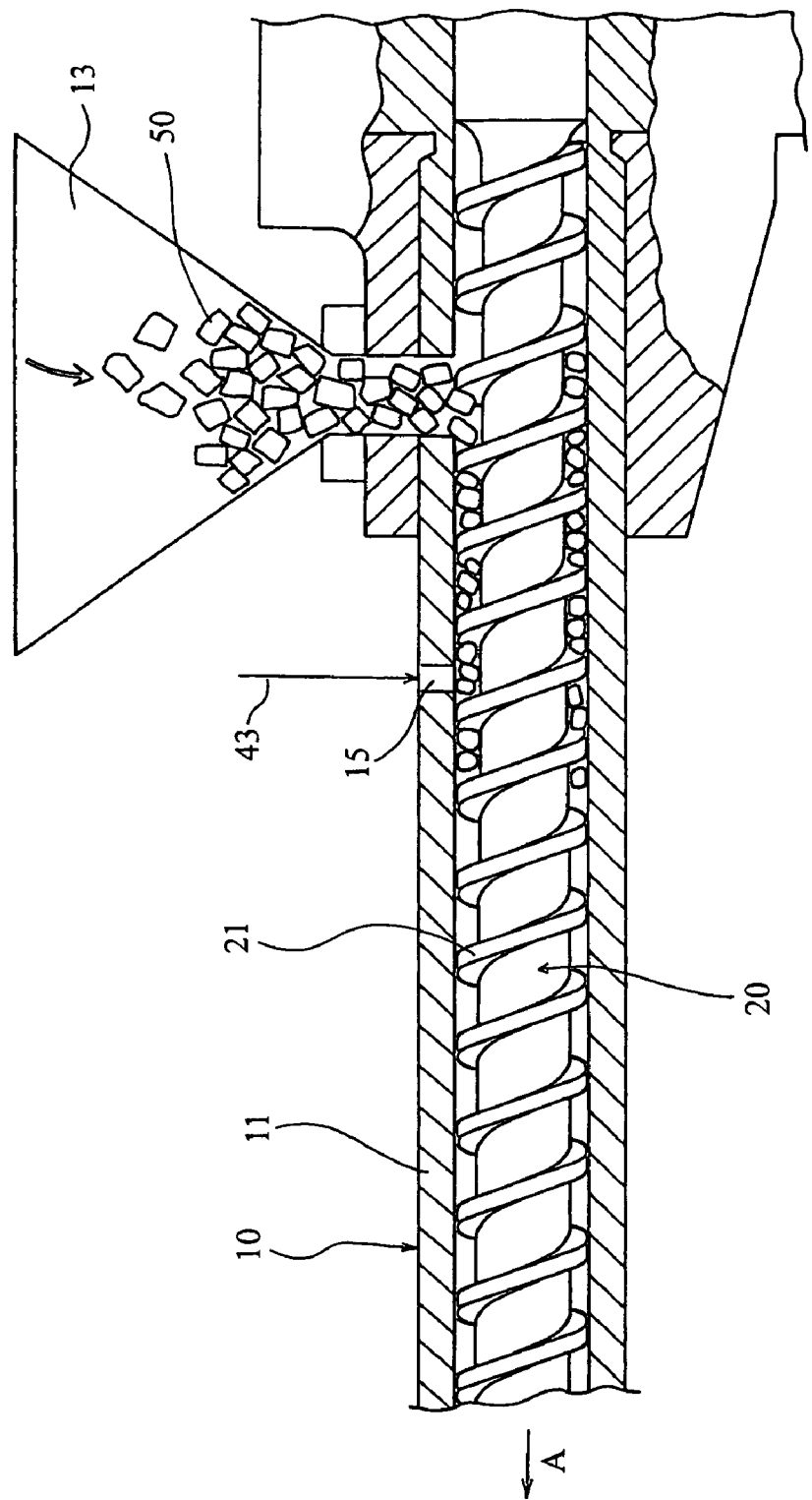
FIG. 3 is a view for explaining an operation of the first embodiment of the invention.

FIGS. 1 to 3 show a first embodiment of the invention. FIG. 1 is a view for illustrating a whole apparatus for removing a surface material of a resin product, of which a part is lacked, FIG. 2 is a section view for illustrating the detailed structures of a cylinder part and a rotor, and FIG. 3 is a view for explaining the operation.

The surface-material removing apparatus 1 has a cylinder part 10 extending approximately in the horizontal direction, a rotor 20 rotatably inserted into a cylinder in the cylinder part 10, a driving part 30 for rotating the rotor 20, and a steam feeding part 40, as shown in FIG. 1.

The cylinder part 10 is formed as one partly-finished goods (i.e., one part) as shown in FIG. 2. On the end on the driving part 30 side of the cylinder part 10, i.e., the outer periphery of the end portion, an inlet 12 for introduction in communication with the inside of the cylinder 11 is formed, and a hopper 13 is connected with the inlet 12, and further an outlet 14 for discharge is opened outward on the end (i.e., the other end) in opposite of the driving part 30. The rotor 20 is formed as one partly-finished goods, and its outer peripheral surface extends helically in an axis direction of the cylinder to form one continuously helical protruding bar 21 whose adjacent projections are arranged at same intervals. In the invention, the projections mean plural bars of the protruding bar in the section view.

The steam feeding part 40 has a means 41 for generating heated steam, a steam feed opening 15 formed in the vicinity of the inlet 12 of the cylinder 11, and a connecting tube 42 for connecting between the heated-steam generating means 41 and the steam feed opening 15. The steam feeding part 40 is configured such that heated steam generated in the heated-steam generating means 41 is fed from the steam feed opening 15 to the inside of the cylinder 11 through the connecting tube 42.

In the first embodiment of the invention, a resin product (e.g., melting point: 162° C.) such as a bumper having a surface material (e.g., paint film) to be peeled is coarsely crushed (or pulverized) in advance, the resultant coarsely crushed product 50, if necessary, together with an abrasive material, is fed as a charging material directly into the hopper 13 or through feeder (not shown) into the hopper 13 whereby the charging material is introduced from the inlet 12 into the cylinder 11, shown in FIG. 3. Further the heated steam (e.g., 110° C. to 140° C.) generated in the heated-steam generating means 41 is fed from the steam-feed opening 15 of the heated-steam generating means 41 into the cylinder 11 through the connecting tube 42.

When the coarsely crushed product 50 is introduced into the cylinder 11 in this way, the coarsely crushed product 50 is fed into the spaces between a gap of the adjacent projections of the helical protruding bar 21 and the cylinder 11, and transported in the direction of the arrow "A" in the cylinder by the rotating force of the rotor 20, and then brought into contact with the heated steam 43 (see FIG. 3) fed from the steam feed opening 15 to be headed to the outlet 14.

In the above step, the coarsely crushed product 50 is stirred (or kneaded) by the rotating force of the rotor 20 and the extrusive force generated by the rotation of the rotor 20, and this stirring enables the rubbing of the coarsely crushed product 50 with each other to generate the frictional heat. The coarsely crushed product 50 is heated by the frictional heat and the contact with the heated steam, and therefore the bonding strength between the surface material and the resin substrate is reduced, and simultaneously the rubbing of the coarsely crushed product 50 with each other gives the force (e.g., shear force) for peeling the surface material from the coarsely crushed product 50 (or the resin substrate) to the coarsely crushed product 50. Under such conditions, the coarsely crushed product 50 is further transported in the direction of the arrow "A" in the cylinder, whereby the surface material is almost completely peeled from the coarsely crushed product 50 (or the resin substrate) to be extruded from the outlet 14 for discharge. Especially, in case the coarsely crushed product 50 is introduced together with the abrasive material, the coarsely crushed product 50 is also in contact with the abrasive material to be rubbed with each other whereby the peeling of the surface material is promoted to enhance efficiency for removing the surface material.

Moreover, the surface material of the coarsely crushed product 50 is peeled in the granular form to be extruded together with the resin substrate from the outlet 14, and therefore the coarsely crushed product 50 can be easily separated into the resin substrate and the surface material by utilizing, for example, specific gravity or particle size or by electrostatic separation. Thus the resin substrate that the surface material is peeled and separated from the crushed product 50 can be recycled and the use of the resin substrate brings about a recycle resin product having high quality.

Furthermore, the cylinder 10, the rotor 20 or the driving part 30 can be constructed by utilizing, for example, the existing extruder and hence the whole apparatus can be easily and inexpensively manufactured.

According to the first embodiment of the invention, provided that chemicals such as organic salts or solvents are not used, and the secondary treatment such as wastewater processing is not performed, the above easy steps that the resin product is coarsely crushed and the coarsely crushed product 50 is transported in the cylinder 11 while stirring the product with the cylinder 11 and the rotor 20 and simultaneously bringing the product into contact with a heated steam 43 fed from the steam feeding part 40 enables peeling of the surface material from the coarsely crushed product to leave the resin substrate. Thus the first embodiment brings about enhancement of efficiency, environment safety and processing capacity in the steps for removing the surface material.

Second Embodiment of the Invention

Figure 4:
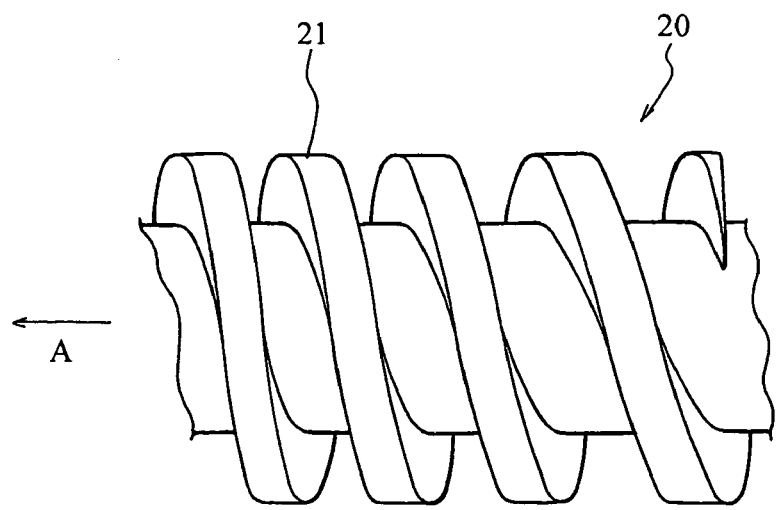
FIG. 4 is a view for explaining an important part of the second embodiment of the invention.

FIG. 4 is a view for explaining an important part of the second embodiment of the invention. In the second embodiment, the helical protruding bar 21 of the rotor 20 is configured such that the intervals of the adjacent projections of the protruding bar 21 is reduced with moving in the direction of the arrow "A" (i.e., moving to the downstream in the direction of transporting the charging material) as shown in FIG. 4.

In the embodiment, the intervals of the projections of the helical protruding bar 21 of the rotor 20 are reduced with moving to the downstream in the direction of transporting the charging material, and therefore the pressure applied to the coarsely crushed product can be enhanced with moving to the downstream in the direction of transporting the charging material, or the pressure for mixing the coarsely crushed product with each other can be prevented from the reduction. Thus the force for peeling the surface material such as paint film by the rubbing can be constantly applied to the coarsely crushed product, and therefore, with the cooperation of the reduction of the bonding strength between the surface material and the resin substrate by the contact of the coarsely crushed product with the heated steam, the surface material can be further surely peeled from the coarsely crushed product.

Third Embodiment of the Invention

Figure 5:
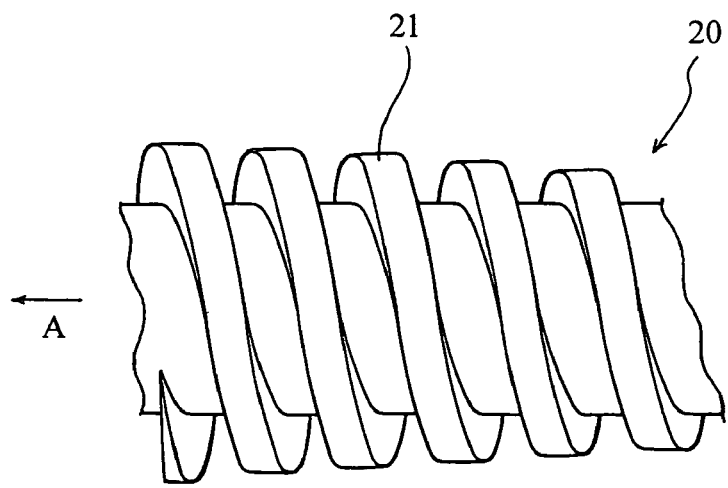
FIG. 5 is a view for explaining an important part of the third embodiment of the invention.

FIG. 5 is a view for explaining an important part of the third embodiment of the invention. In the third embodiment, the helical protruding bar 21 of the rotor 20 is configured such that the projections of the protruding bar 21 is increased in the outer diameter with moving in the direction of the arrow "A" (i.e., moving to the downstream in the direction of transporting the charging material) as shown in FIG. 5.

Also in the embodiment, the gaps between the helical protruding bar 21 and the cylinder 11 are reduced with moving to the downstream in the direction of transporting the charging material, and therefore the pressure applied to the coarsely crushed product can be enhanced with moving to the downstream in the direction of transporting the charging material, or the pressure for mixing the coarsely crushed product with each other can be prevented from the reduction. Thus the force for peeling the surface material such as paint film by the rubbing can be constantly applied to the coarsely crushed product, and therefore, similarly as the second embodiment, with the cooperation of the reduction of the bonding strength between the surface material and the resin substrate by the contact of the coarsely crushed product with the heated steam, the surface material can be further surely peeled from the coarsely crushed product.

Fourth Embodiment of the Invention

Figure 6:
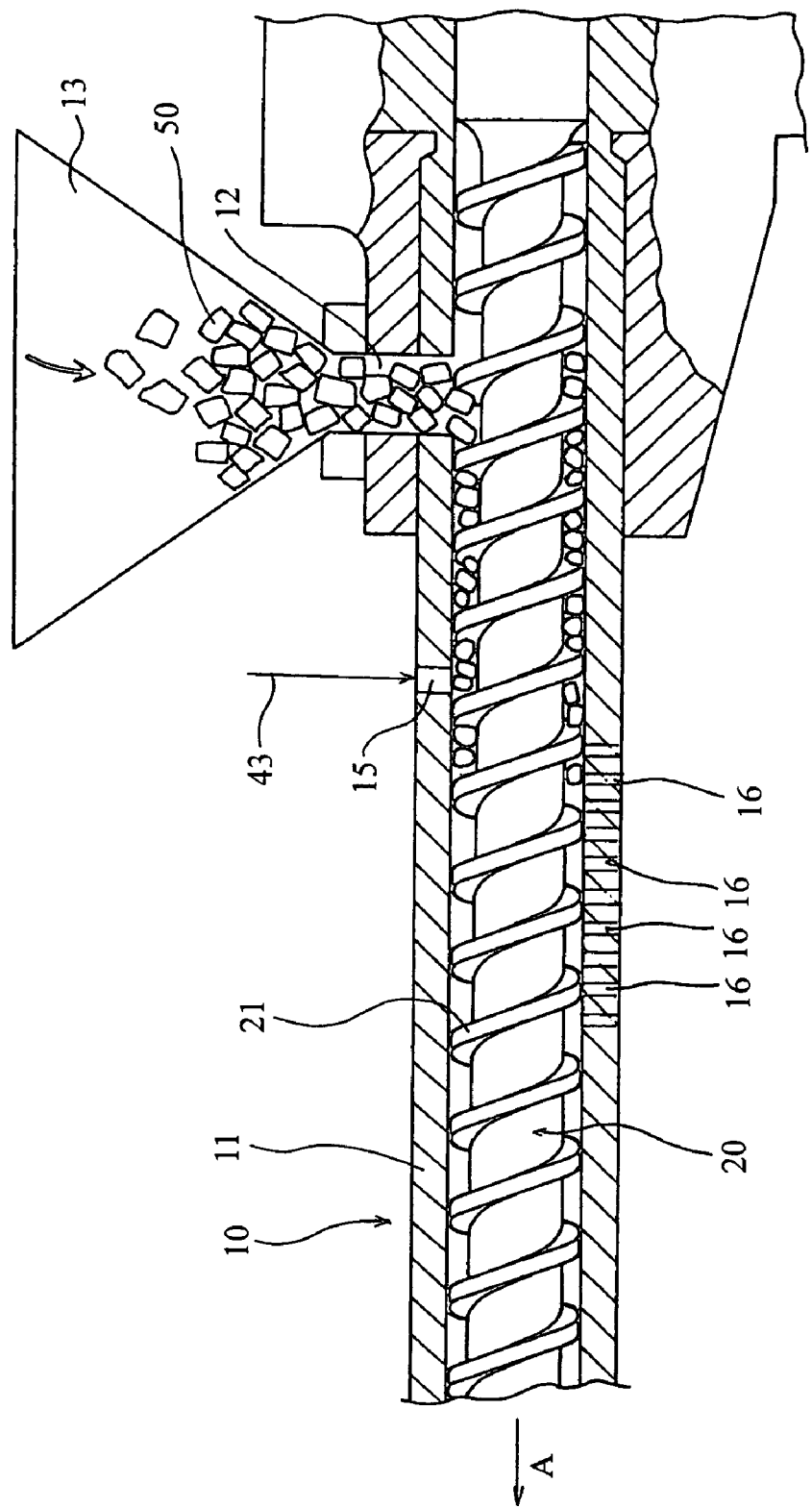
FIG. 6 is a view for explaining an important part of the fourth embodiment of the invention.

FIG. 6 is a view for explaining an important part of the fourth embodiment of the invention. In each of the above embodiments, a large number of openings 16 having smaller diameter than the size of the coarsely crushed product are formed on a portion of the cylinder 11 on the downstream side of the steam feed part opening 15. The openings 16 may be formed directly on the cylinder 11, or formed in the form of mesh on the cylinder 11.

In this way, by formation of the many openings 16 on the cylinder 11, the coarsely crushed product 50 collides with the edge portions of the openings 16 to promote the stirring effect and/or the rubbing effect of the surface material. Thus, with the cooperation of the contact of the coarsely crushed product with the heated steam, the efficiency for removing the surface material can be further enhanced. Further, a part of the surface material peeled in the cylinder can be passed and dropped through the many openings 16, and hence the discharge extruded from the outlet 14 is easily separated into the resin substrate and the surface material.

Fifth Embodiment of the Invention

Figure 7:
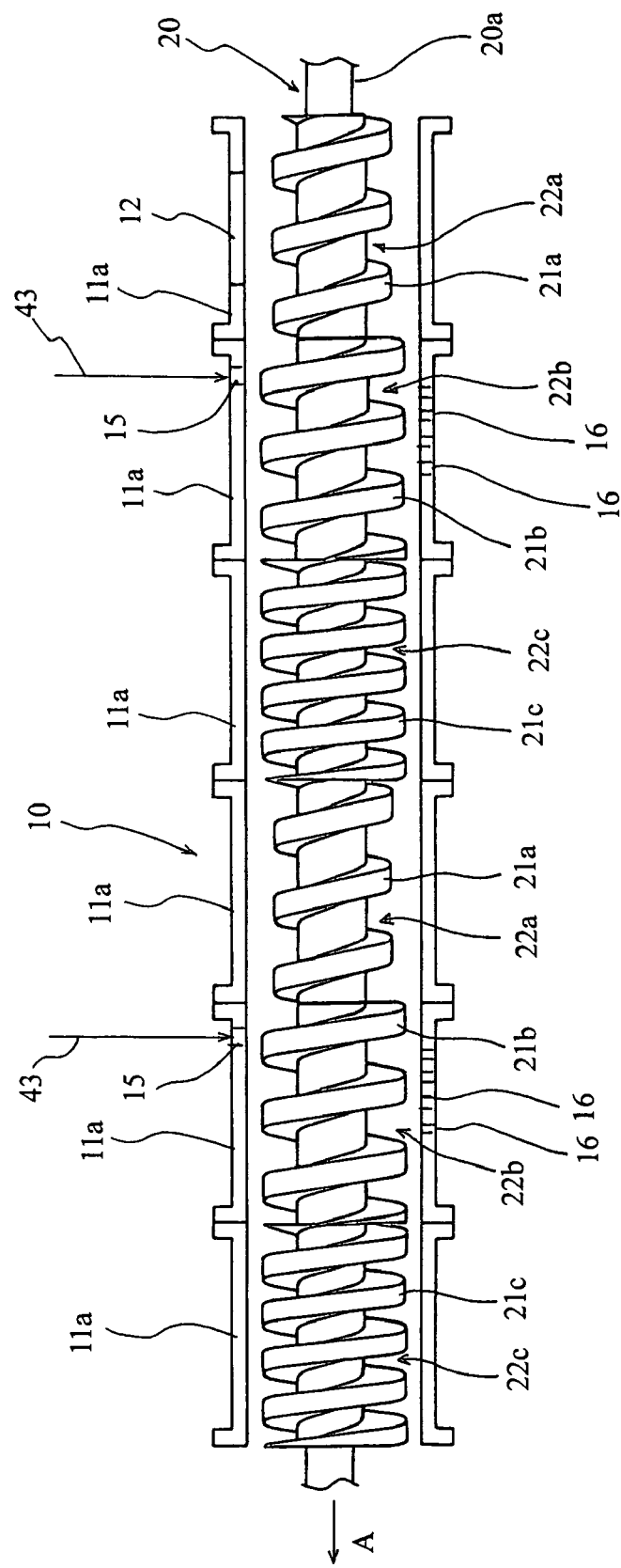
FIG. 7 is a view for explaining an important part of the fifth embodiment of the invention.

FIG. 7 is a view for explaining an important part of the fifth embodiment of the invention. In the structure of FIG. 7, the cylinder part is constructed by removably connecting plural cylinder elements 11a with each other in the axis direction of the cylinder. An inlet 12 for introduction is formed on a cylinder element 11a corresponding to a portion where the coarsely crushed product of the resin product is introduced.

Further, the rotor 20 is constructed by bonding plural rotor elements (bars) to a rotation axis (shaft) in the axis direction such that the elements can be rotated. In the embodiment, in the direction from the upstream to the downstream (i.e., in the direction of transporting the charging material shown in the arrow "A"), three kinds of rotor elements, i.e., the rotor element 22a provided with the helical protruding bar 21a having a small outer diameter, the rotor element 22b provided with the helical protruding bar 21b having a large outer diameter and having the same intervals of projections as the helical protruding bar 21a, and the rotor element 22c provided with the helical protruding bar 21c having the same outer diameter as the helical protruding bar 21b and intervals of projections smaller than that of the helical protruding bar 21b are repeated in this unit and bonded with each other to form the rotor 20.

Though the rotor elements 22a to 22c have function of transporting the coarsely crushed product, the rotor element 22b has function mainly stirring the coarsely crushed product and the rotor element 22c function has mainly pressurizing the coarsely crushed product.

In the embodiment, further a steam feeding opening 15 is formed on a cylinder element 11a corresponding to the rotor element 22b having stirring function, and heated steam generated from the common means for generating heated steam is fed into the cylinder element 11a through the connecting tube to be brought into contact with the coarsely crushed product that is transported under stirring. A large number of openings 16 having a diameter smaller than the size of the coarsely crushed product are formed on the bottom of the cylinder element 11a corresponding to the position of the rotor element 22b in the same manner as the fourth embodiment.

According to this embodiment, in the area of the rotor element 22a having the helical protruding bar 21a having a small diameter, the charging material can be rubbed in the transporting stage. Thereafter, the charging material can be sufficiently heated and rubbed by the heated steam 43 in the stirring stage in the area of the rotor element 22b provided with the helical protruding bar 21b having a large outer diameter and having the same intervals of projections as the helical protruding bar 21a. Further, the large number of openings 16 enables the promotion of stirring effect and rubbing effect on the surface material in the same manner as the fourth embodiment. In the area of the rotor element 22c provided with the helical protruding bar 21c having the same outer diameter as the helical protruding bar 21b and intervals smaller than that of the helical protruding bars 21b, the charging material can be rubbed with each other in the pressurizing stage and moreover these effects (i.e., stirring, rubbing and pressurizing effects) are repeatedly brought about with the transportation of the charging material, and hence the surface material can be effectively removed from the coarsely crushed product of the resin product.

Further, a part of the surface material peeled in the cylinder element 11a corresponding to the position of the rotor element 22b is passed through the large number of openings 16 to be dropped downward, whereby the amount of the surface material contained in the discharge extruded from the outlet 14 is reduced to render the separation from the discharge into the resin substrate and the surface material easy.

Furthermore, the cylinder part 10 is divided into plural elements and therefore it is easy to connect the rotor elements 22a to 22c with each other to construct the rotor 20.

The steam feeding opening 15 and the large number of openings 16 are formed on not only the cylinder element 11a corresponding to the position of the rotor element 22b but also the cylinder element 11a corresponding to the position of the rotor element 22a, which brings about the contact of the charging material with the heated steam 43 and the promotion of stirring effect and rubbing effect of the openings 16 on the surface material.

Sixth Embodiment of the Invention

Figure 8:
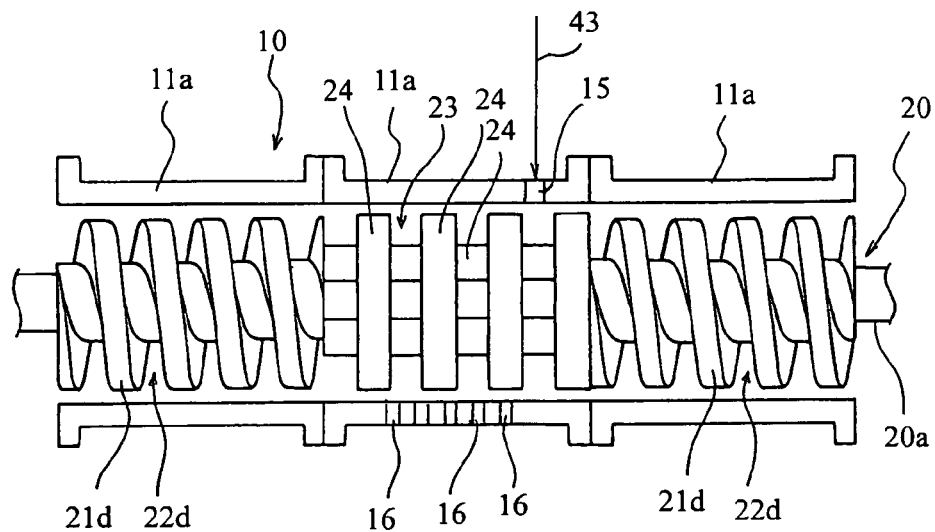
FIG. 8 is a view for explaining an important part of the sixth embodiment of the invention.
Figure 9:
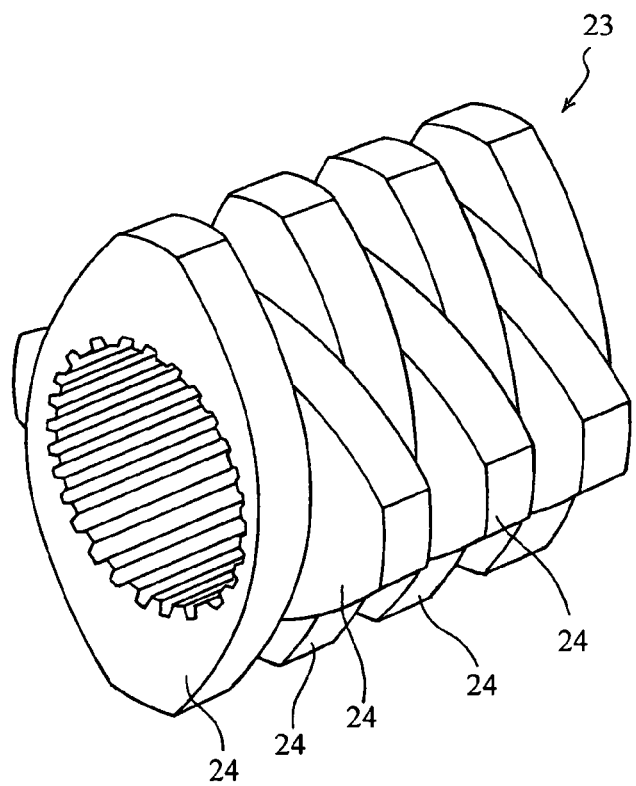
FIG. 9 is a partially perspective view of FIG. 8

FIGS. 8 and 9 are a view for explaining an important part of the sixth embodiment of the invention. In the sixth embodiment, the rotor 20 is configured such that the rotor element 22d having the helical protruding bar 21d and the rotor element 23 having the protruding bar in the form different from the helical protruding bar are disposed on the rotation axis such that the rotor element 23 is located between an appropriate two protruding bars of plural helical protruding bars 21d, and simultaneously the steam feeding opening 15 and a large number of openings 16 are formed on the cylinder element 11a where the rotor element 23 is located.

The rotor element 23 is configured such that plural protruding bars 24 in the external form of ellipse are arranged in parallel to the axis direction and the long axes of the adjacent ellipse shaped protruding bars 24 are intersected (in the embodiment, at right angle) as seen from the axis direction, as shown as its perspective view in FIG. 9.

In the above-mentioned structure, the charging material can be rubbed with each other while transporting in the area the rotor element 22d having the helical protruding bar 21d, and the charging material is stirred while scarcely transporting it (in an approx. retaining condition) and while bringing into contact with the heated steam 43 to be rubbed with each other. Simultaneously, the openings 16 promote stirring effect and rubbing effect on the surface material, and hence the surface material can be effectively removed from the coarsely crushed product of the resin product.

Seventh Embodiment of the Invention

Figure 10:
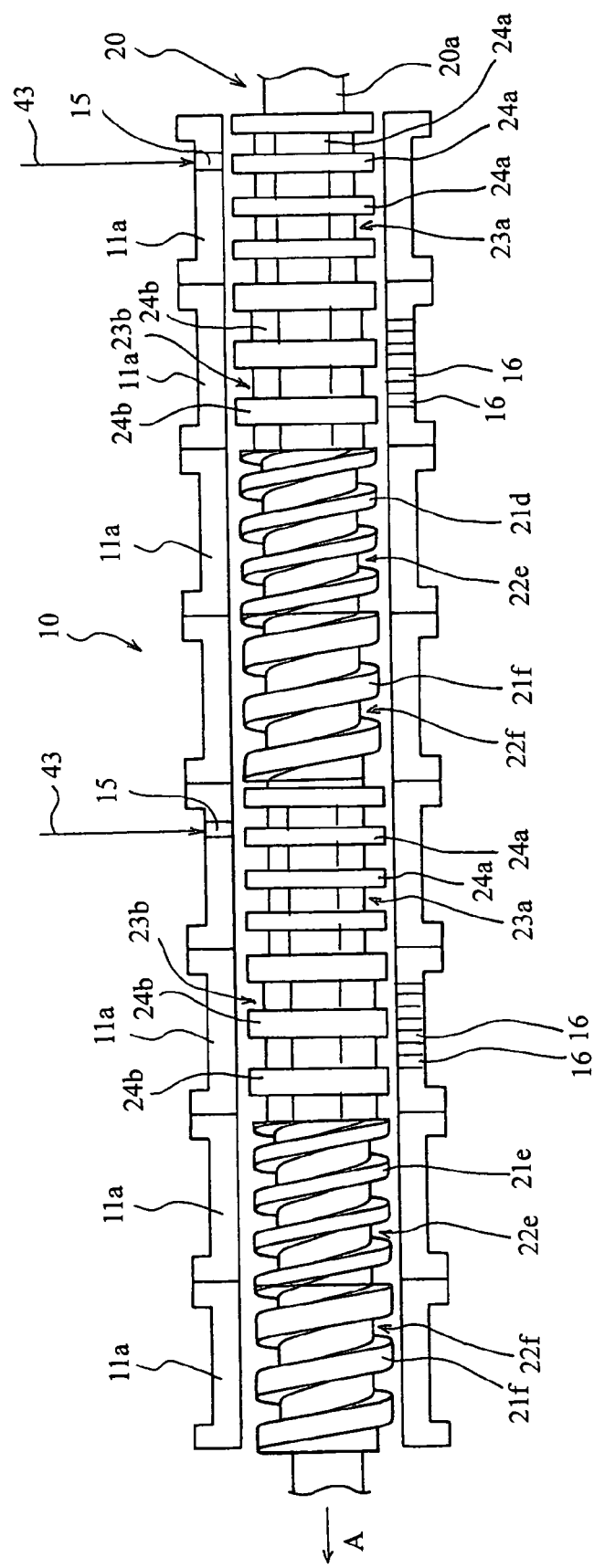
FIG. 10 is a view for explaining an important part of the seventh embodiment of the invention.

FIG. 10 is a view for explaining an important part of the seventh embodiment of the invention. In the embodiment, the cylinder part 10 is constructed by plural cylinder elements 11a connected with each other so that can be freely attached and removed in the axis direction, and simultaneously the rotor 20 is constructed by combining plural rotor elements having helical protruding bars in the form different from each other, with plural rotor elements having ellipse shaped protruding bars in the form different from each other.

The above-mentioned rotor 20 is constructed by connecting four kinds of rotor elements, i.e., a rotor element 23a provided with plural ellipse shaped protruding bars 24a having a small width and short axis length, a rotor element 23b provided with plural ellipse shaped protruding bars 24b having a width and short axis length larger (longer) than the rotor element 23a, a rotor element 22e provided with the helical protruding bar 21e having a small width and a small intervals between the protruding bars, and a rotor element 22f provided with the helical protruding bar 21f having a width and intervals lager than the rotor element 22e, to a rotation axis 20a in this order and repeatedly, in the direction of the arrow "A" (i.e., from the upstream to the downstream in the direction of transporting the charging material).

On at least one of the cylinder elements 11a where the rotor elements 23a, 23b, 22e, 22f are each located, a steam feed opening 15 is formed, whereby heated steam is fed, and simultaneously, if necessary, a large number of openings 16 are formed. In the embodiment, the steam feed opening 15 is formed on the cylinder element 11a where the rotor element 23a is located and the many openings 16 are formed on the cylinder element 11a where the rotor element 23b is located.

Hence, according to the embodiment, the charging material is approximately retained and stirred under different conditions to be rubbed with each other in the areas of the rotor elements 23a and 23b, and is rubbed with each other under different transporting conditions in the areas of the rotor elements 22e and 22f. Such actions are repeatedly effected depending upon the transportation of the charging material, and therefore with the cooperation of heating effect by the heated steam 43, and of stirring effect and/or rubbing effect on the surface material by the openings 16, the surface material can be effectively removed from the coarsely crushed product of the resin product.

Eighth Embodiment of the Invention

Figure 11:
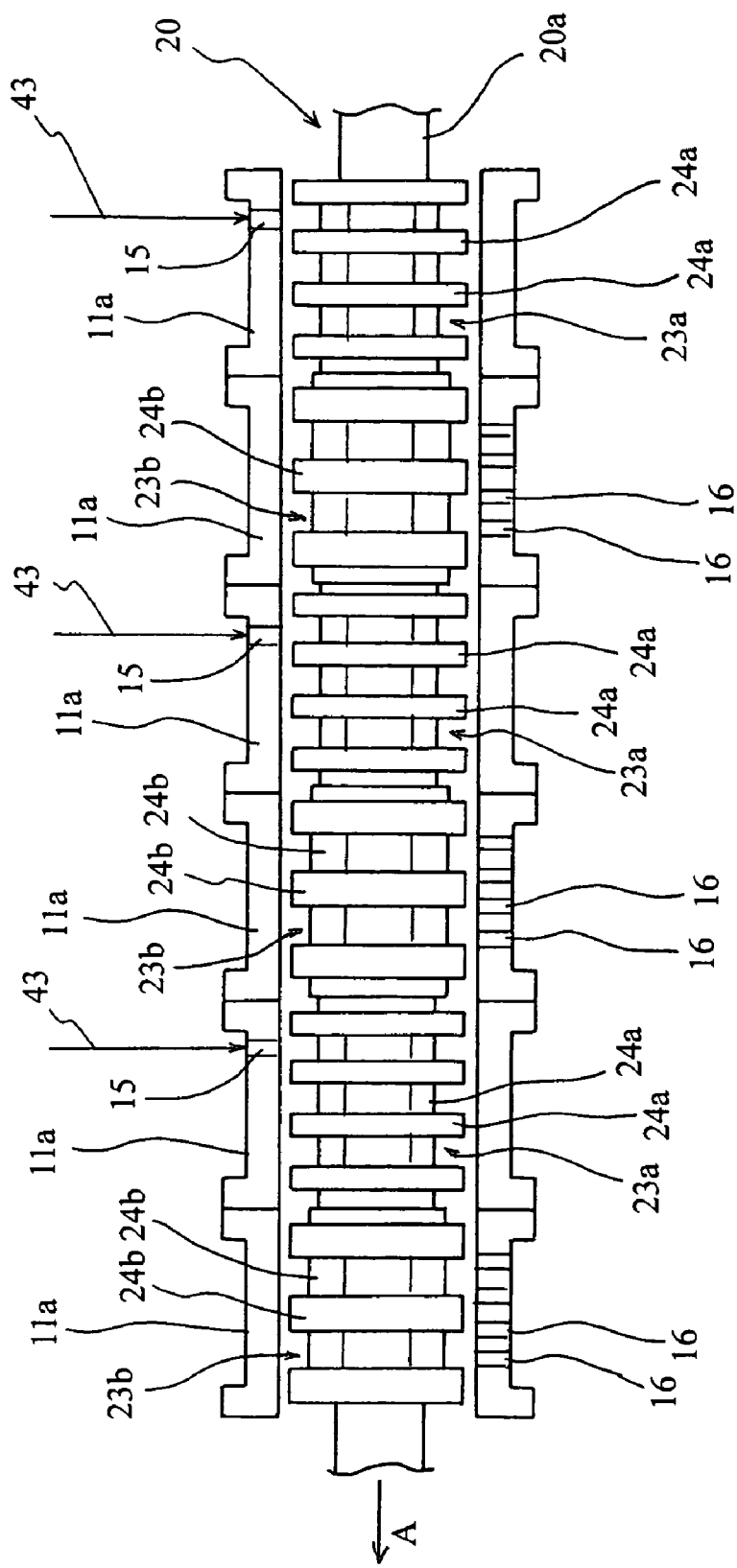
FIG. 11 is a view for explaining an important part of the eighth embodiment of the invention.

FIG. 11 is a view for explaining an important part of the eighth embodiment of the invention. In the eighth embodiment, the rotor 20 is constructed by connecting two kinds of rotor elements having ellipse shaped protruding bars, i.e., a rotor element 23a provided with plural ellipse shaped protruding bars 24a having a small width and short axis length, and a rotor element 23b provided with plural ellipse shaped protruding bars 24b having a width and short axis length lager than the rotor element 23a, to a rotation axis 20a in this order and repeatedly, in the direction from the upstream to the downstream (i.e., in the direction of transporting the charging material shown in the arrow "A").

Also, in the embodiment, the charging material is approximately retained and stirred under different conditions to be rubbed with each other in the areas of the rotor elements 23a and 23b and simultaneously transformed in the direction of the arrow "A", and therefore with the cooperation of heating effect by the heated steam 43, and of stirring effect and/or rubbing effect on the surface material by the openings 16, the surface material can be effectively removed from the coarsely crushed product of the resin product.

Ninth Embodiment of the Invention

Figure 12:
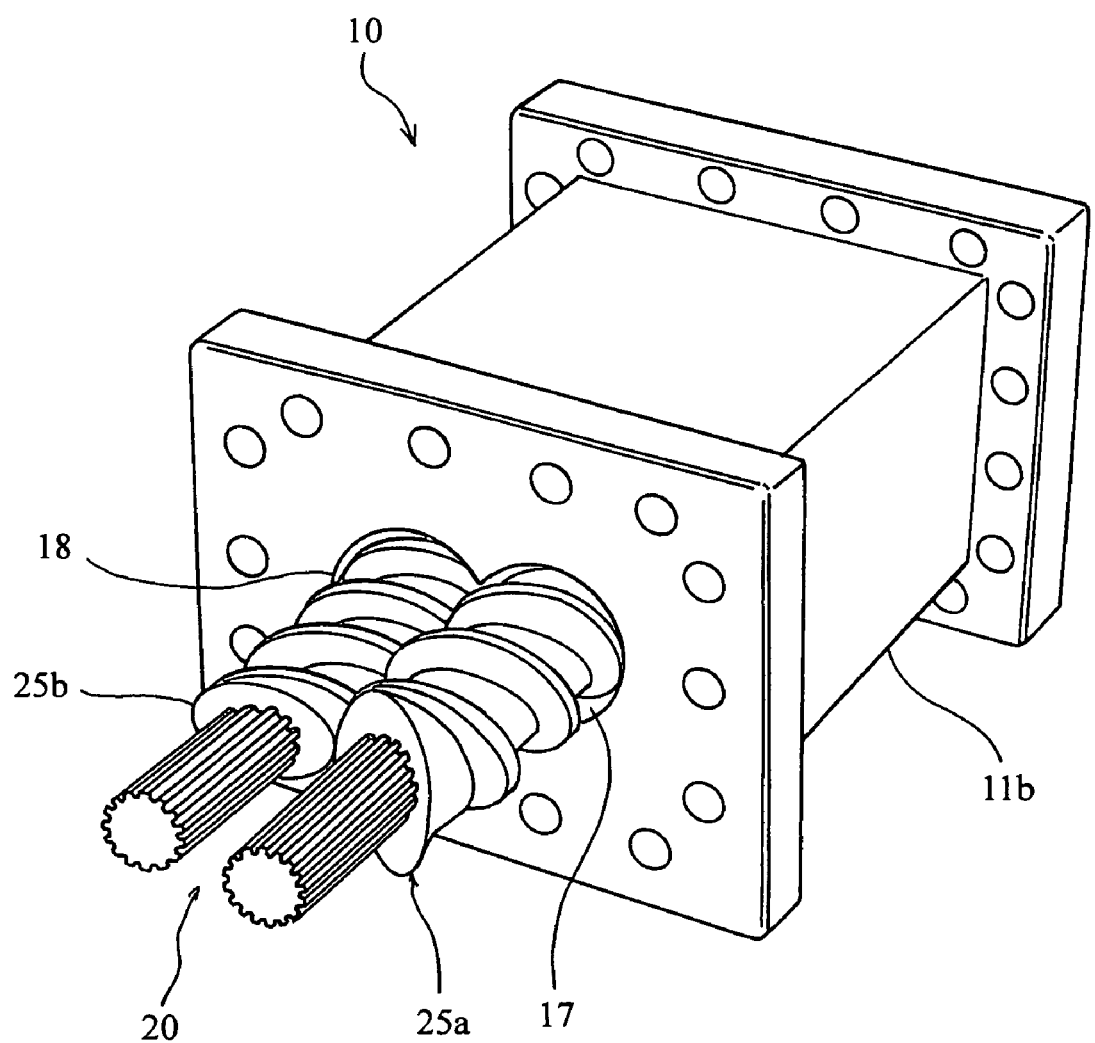
FIG. 12 is a view for explaining an important part of the ninth embodiment of the invention.

FIG. 12 is a view for explaining an important part of the ninth embodiment of the invention. In FIG. 12, the cylinder 10 is constructed by plural cylinder elements 11b connected with each other so that can be freely attached and removed in the axis direction, and simultaneously a first cylinder 17 and a second cylinder 18 are formed on each of the cylinder elements 11b such that the two cylinders are parallel to each other and the partial areas of the two cylinders are overlapped with each other.

Further, a rotor 20 is constructed by rotatably inserting a first rotor 25a and a second rotor 25b into the first cylinder 17 and a second cylinder 18 respectively, and the first and second rotors are rotated in the same direction by a driving part 30. On the first rotor 25a and the second rotor 25b, the helical protruding bar and ellipse shaped protruding bar, which are mentioned in the above embodiments, are formed, and simultaneously, the steam feed opening (not shown) is provided on the cylinder elements 11b that mainly serves to transport or stir the charging material to feed the heated steam in the same manner as in the embodiments, and if necessary a large number of openings are provided on the cylinder elements 11b in the same manner as in the embodiments.

In this ninth embodiment, the charging material is subjected to treatment for peeling the surface material while being in contact with the heated steam in the first cylinder 17 and second cylinder 18, whereby capacity for the treatment can be enhanced. Further, the charging material is moved between the first cylinder 17 and second cylinder 18 and rubbed while being stirred, and hence the surface material can be effectively removed.

Tenth Embodiment of the Invention

Figure 13:
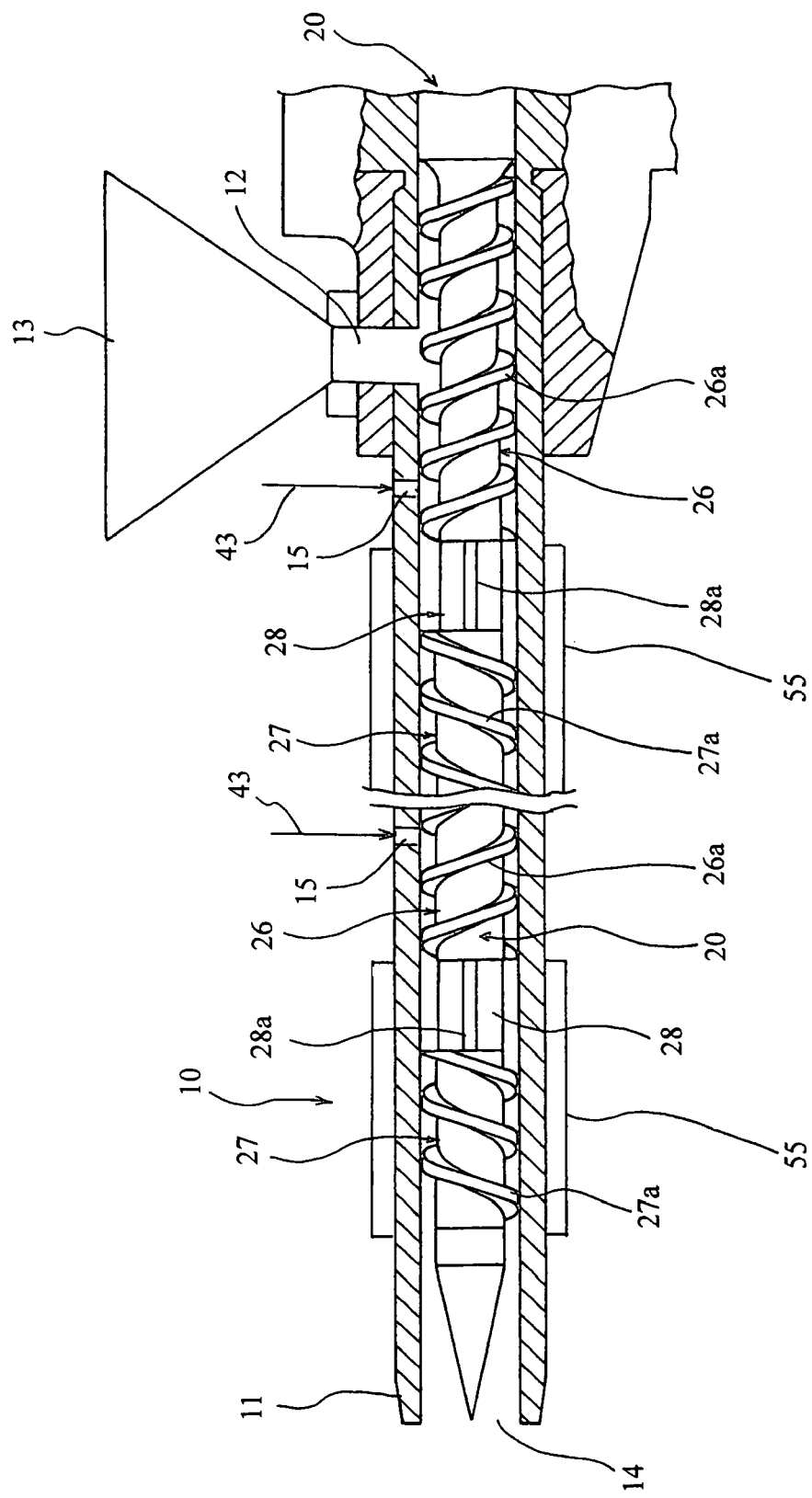
FIG. 13 is a view for explaining an important part of the tenth embodiment of the invention.

FIG. 13 is a view for explaining an important part of the tenth embodiment of the invention. In FIG. 13, the rotor 20 is composed of plural sets of the following three parts in the axis direction, i.e., a transporting helical protruding bar part 26 comprising a transporting helical protruding bar 26a for transporting the charging material introduced from the inlet 12 to the outlet 14 side, a backing-up (backflow) helical protruding bar part 27 comprising a helical protruding bar 27a for backing up the charging material to a side of the inlet by a backward transporting force less than the transporting force of the helical protruding bar for transporting the charging material, and a stirring protruding bar part 28 for comprising one protruding bar 28a for stirring the charging material while scarcely transporting it, the stirring protruding bar part 28 being extended linearly in the axis direction and provided between the transporting helical protruding bar part 26 and the backing-up helical protruding bar part 27. In the rotor 20, the transporting helical protruding bar part 26 is provided at least on the inlet.

The steam feed opening 15 is formed on the cylinder 11 at the position corresponding to each of the transporting helical protruding bar parts 26, and heated steam 43 generated from the means for generating heated steam is fed from steam feed opening 15 through a connecting tube into the cylinder 11 in the same manner as in the first embodiment.

Further, a cooling means 55 is provided on the cylinder 11 where the backing-up helical protruding bar part 27 and the stirring protruding bar part 28 are located, whereby the portion of the cylinder 11 can be cooled to a predetermined temperature (e.g., 20° C. to 50° C.).

In the tenth embodiment, the coarsely crushed product of the resin product introduced in the cylinder 11 is transported in the cylinder in the direction of the arrow "A" by rotation of the rotor 20. In this transportation, the coarsely crushed product is rubbed with each other in the transporting helical protruding bar parts 26 by the rotating force and the pushing force of the coarsely crushed product by the rotation, and further transformed while being in contact with the heated steam from the steam feed opening 15, and then extruded out in the backing-up helical protruding bar part 27 while withstanding the backward transporting force by the rotation. Hence, the coarsely crushed product is rubbed with each other by the increased pushing force. In the stirring protruding bar part 28, the coarsely crushed product is approximately retained and stirred under pressure by the transporting force of the transporting helical protruding bar parts 26 and the backward transporting force of the backing-up helical protruding bar part 27, whereby the product is rubbed with each other. These processings are repeatedly carried out in the corresponding portion with the transportation of the coarsely crushed product. Moreover, the coarsely crushed product is cooled to a predetermined temperature by the cooling means 55 in the cylinder 11 corresponding to the positions of the backing-up helical protruding bar part 27 and the stirring protruding bar part 28.

Thus, the coarsely crushed product is surely rubbed with each other with receiving pressure in the cylinder 11 to be transported under stirring, and heated in the transporting helical protruding bar parts 26 by the heated steam 43, whereby the surface material can be effectively peeled from the coarsely crushed product. Moreover, in the backing-up helical protruding bar part 27 and the stirring protruding bar part 28, the cylinder 11 is cooled to a predetermined temperature by the cooling means 55, and therefore the charging material is surely prevented from fusing due to the heat generated by its rubbing with each other or the heating by the heated steam 43 to enable surely peeling of the surface material from the coarsely crushed product (or resin substrate).

Figure 14:
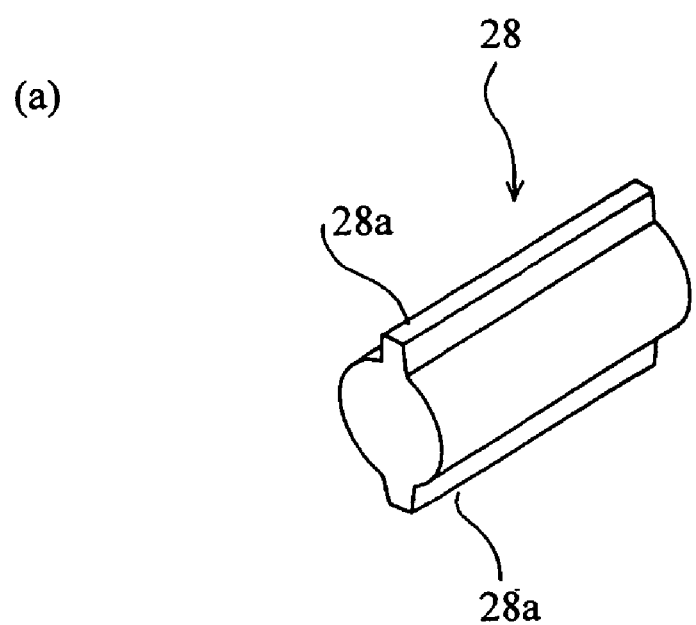
FIG. 14 is a view for explaining a variant of a stirring protruding bar illustrated in FIG. 13.
Figure 14:
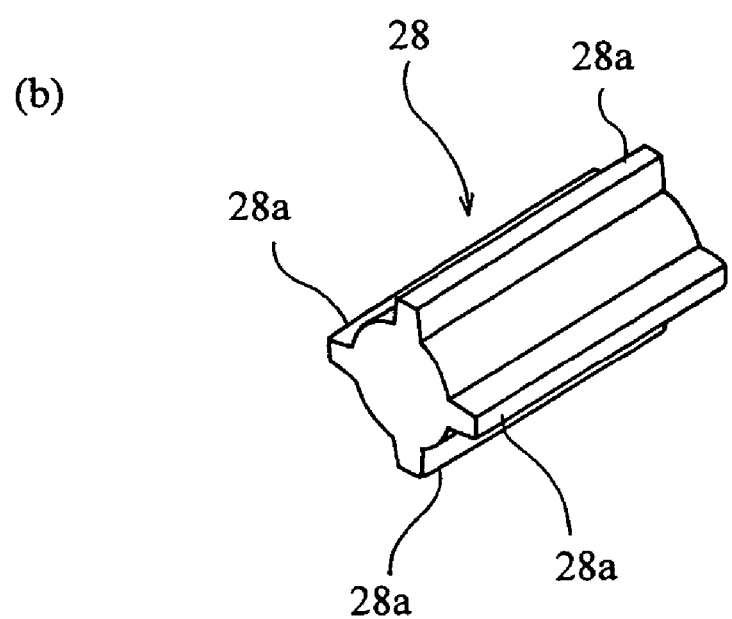

In the stirring protruding bar part 28, the height of the stirring protruding bar 28a may be varied in the axis direction, for example the height of the central portion is reduced. Otherwise, two stirring protruding bars 28a may be provided symmetrically as shown in FIG. 14(a), or four stirring protruding bars 28a may be provided symmetrically as shown in FIG. 14(b). Hence, the stirring efficiency can be enhanced to effectively remove the surface material.

Further, the length in the axis direction of the backing-up helical protruding bar part 27 is reduced compared with that of the transporting helical protruding bar part 26, or a gap between the helical protruding bar 27a for backing up and the inner peripheral surface of the cylinder is increased compared with that between the helical protruding bar 26a for transporting and the inner peripheral surface of the cylinder, whereby the coarsely crushed product can be also smoothly transported under appropriate pressure.

Eleventh Embodiment of the Invention

Figure 15:
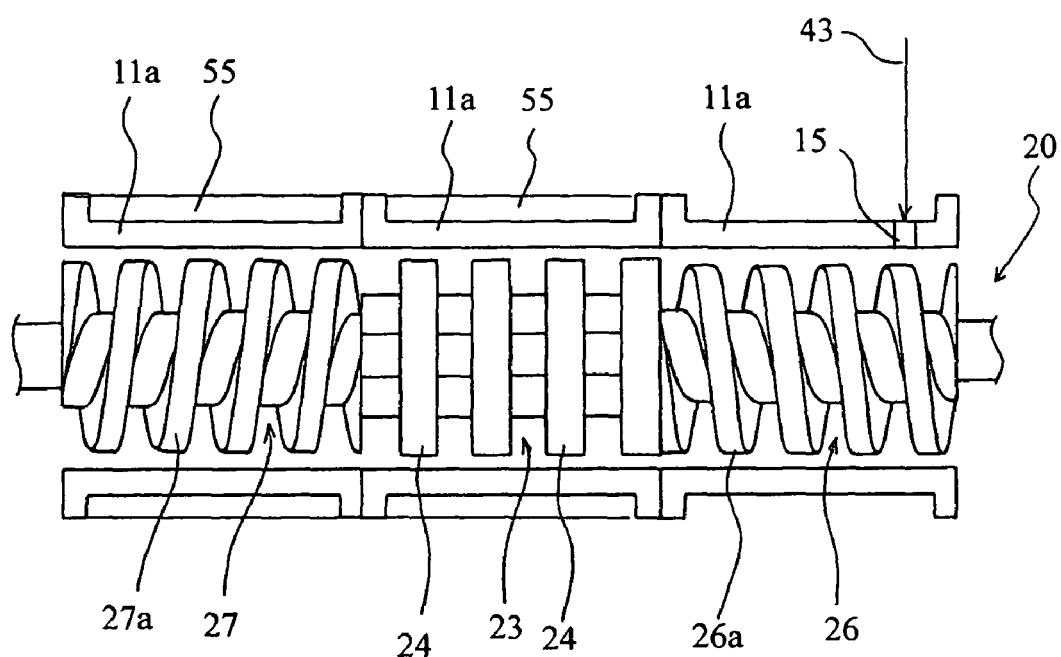
FIG. 15 is a view for explaining an important part of the eleventh embodiment of the invention.

FIG. 15 is a view for explaining an important part of the eleventh embodiment of the invention. In the embodiment, instead of the stirring protruding bar part 28 in the tenth embodiment, a rotor element 23 having the same ellipse shaped protruding bar 24 as in FIG. 9 is provided between the transporting helical protruding bar part 26 and the backing-up helical protruding bar part 27 to form the rotor 20, and simultaneously plural cylinder elements 11a are connected with each other in the axis direction so that can be freely removed and attached to form the cylinder part 10.

The inlet for introduction is formed on the cylinder element 11a corresponding to the portion introducing the coarsely crushed product of the resin product, the steam feed opening 15 is formed on the cylinder element 11a corresponding to the position of the transporting helical protruding bar part 26 to enable feeding of heated steam 43. The cylinder elements 11a corresponding to the positions of the backing-up helical protruding bar part 27 and the rotor element 23 are configured so as to be cooled by the cooling means 55.

The provision of the rotor element 23 having the ellipse shaped protruding bar 24 between the transporting helical protruding bar part 26 and the backing-up helical protruding bar part 27 enables enhancement of stirring effect in this portion compared with the provision of the stirring protruding bar part 28, whereby the coarsely crushed product can be effectively stirred under pressure to be surely rubbed with each other, resulting in enhancement of efficiency for removing the surface material.

Twelfth Embodiment of the Invention

Figure 16:
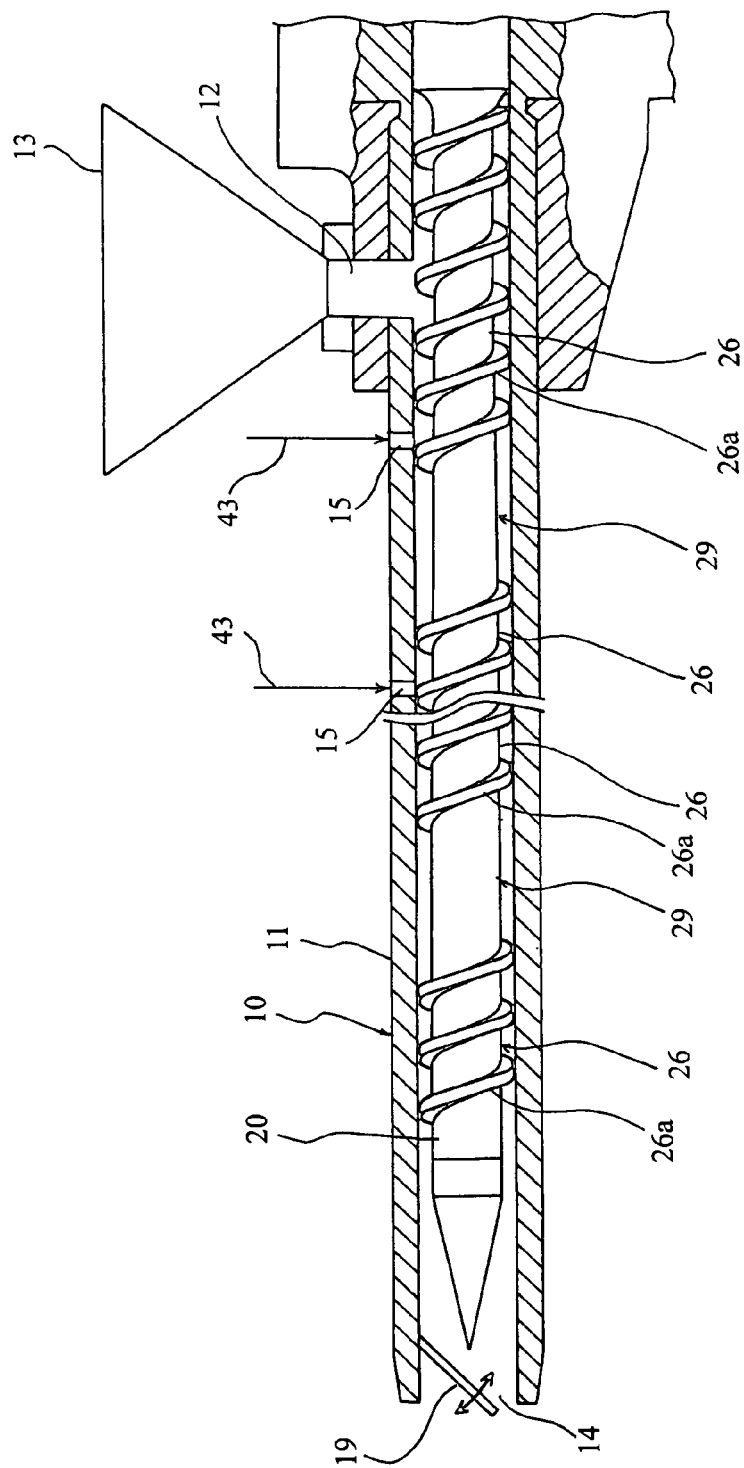
FIG. 16 is a view for explaining an important part of the twelfth embodiment of the invention.
Figure 17:
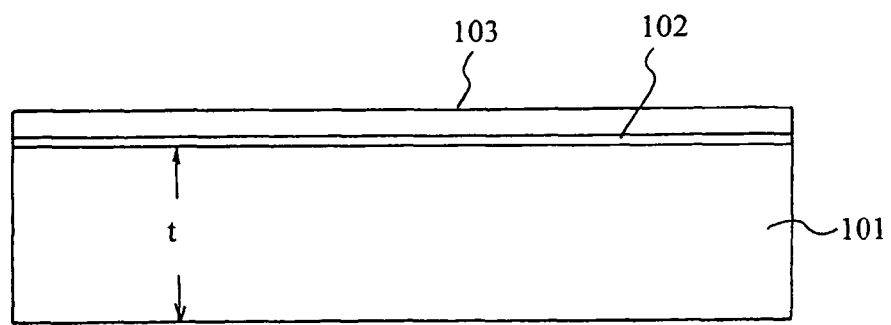
FIG. 17 is a section view for an important part of a bumper made of resin.
Figure 18:
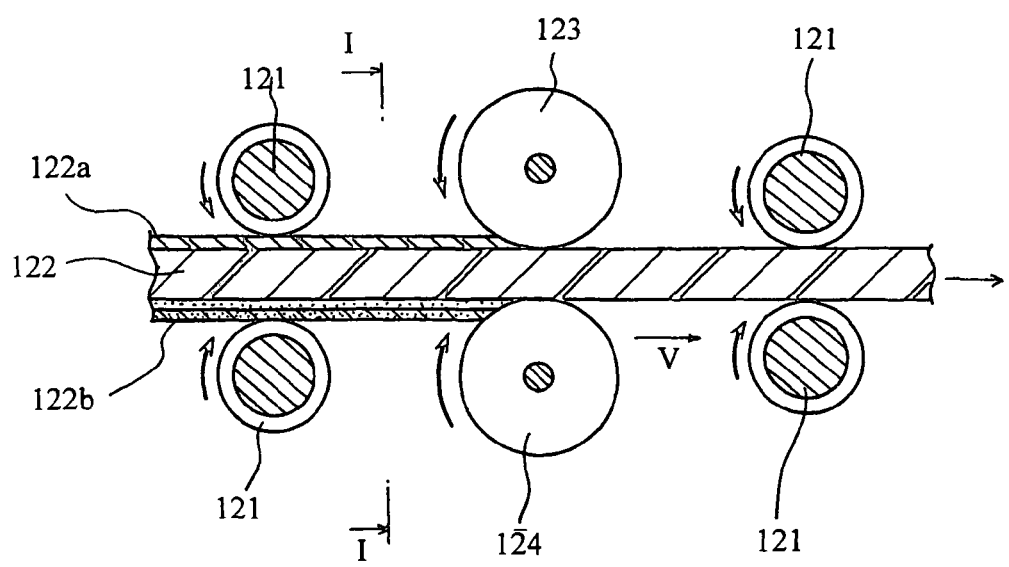
FIG. 18 is an elevation view for schematically illustrating a conventional apparatus for removing.
Figure 19:
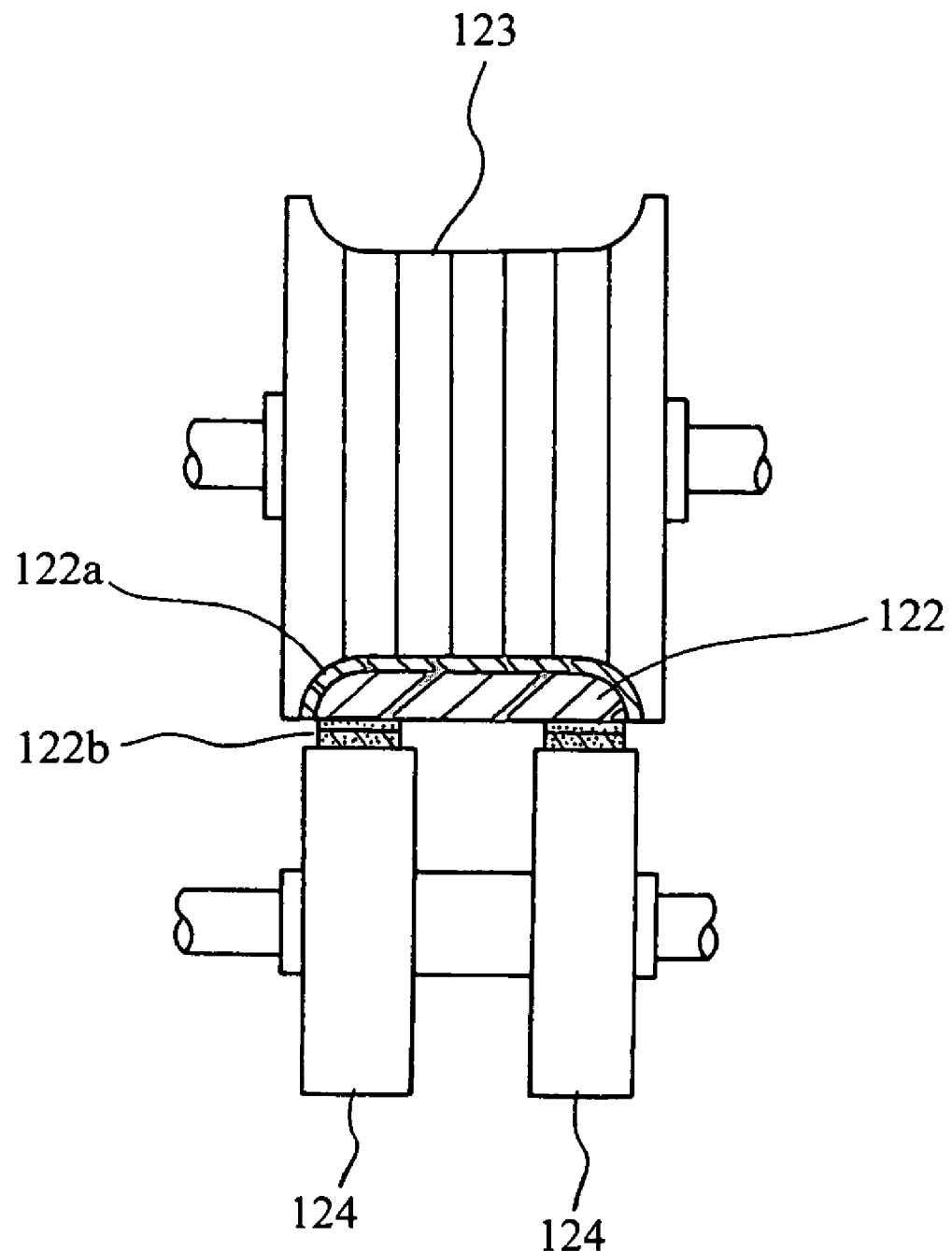
FIG. 19 is a section view of FIG. 18 taken in I-I.

FIG. 16 is a view for explaining an important part of the twelfth embodiment of the invention. A discharge control valve 19 for adjusting the discharge amount of the charging material from the outlet 14 is provided on the outlet 14 side of the cylinder 11, in the twelfth embodiment. The rotor 20 is composed of plural sets of the transporting helical protruding bar part 26 having the transporting helical protruding bar 26a and a cylindrical void portion 29 forming a constant gap in the peripheral direction between an inner peripheral surface of the cylinder 11 and the transporting helical protruding bar part 26, the plural sets being disposed in the axis direction. Further the steam feed opening 15 is formed on the cylinder 11 corresponding to the position of the transporting helical protruding bar part 26.

According to this embodiment, the coarsely crushed product is heated with the heated steam 43 in the cylinder 11 by appropriately controlling a discharge amount of the coarsely crushed product from the cylinder 11 using the discharge control valve 19, further the coarsely crushed product is transported and rubbed with each other under pressure and simultaneously, in the cylindrical void portion 29 of the cylinder 20, the coarsely crushed product is subjected to good mixing action under pressure. Hence, in the same manner as the above-mentioned embodiment, the surface material can be effectively peeled from the coarsely crushed product, and therefore efficiency for removing the surface material, environmental safety and processing capacity can be enhanced.

Further, in case the rotor element 23 having the ellipse shaped protruding bar 24 shown in the eleventh embodiment is provided on an appropriate portion of the rotor 20, the provision of this rotor element 23 enables stirring of the coarsely crushed product under pressure and surely rubbing of the coarsely crushed product with each other, whereby efficiency for removing the surface material can be enhanced.

While the presently preferred embodiments of the present invention have been shown and described, it is to be understood that disclosures are for the purpose of illustration and that various changes and modification may be made without departing from the scope of the invention as set forth in the appended claims. For example, in the preferred embodiments of the invention, though the steam feed part 40 is configured so as to feed the heated steam generated from means 41 for generating heated steam from the steam feed opening 15 to the cylinder 10 through the connecting tube 42, it is also possible that the cylinder is heated by a cylinder heating means and liquid is fed to the heated portion inside the cylinder by a liquid feed means to vaporize the liquid whereby the resultant heated steam of the liquid is brought into contact with the charging material. Thus, the heated steam can be effectively brought into contact with the charging material to surely reduce bonding strength between the surface material and the resin substrate whereby efficiency for removing the surface material can be enhanced. Further, in the tenth and twelfth embodiments, a large number of openings can be also formed on an appropriate portion of the cylinder 10 to promote the stirring effect and/or the rubbing effect of the surface material.

What is claimed is:

1. An apparatus for removing a surface material from a resin product having a resin substrate and the surface material formed thereon by means of coating or adhesive bonding, the apparatus comprising:
a cylinder part having on one end side thereof an inlet for introduction of a charging material consisting of the coarsely crushed product or a mixture of the coarsely crushed product and an abrasive material, and on the other end side of the cylinder an outlet for discharging the charging material, the cylinder being extended horizontally;
a rotor rotatably inserted into a cylinder of the cylinder part and transporting the charging material from the inlet to the outlet while stirring, the rotor having
a transporting helical protruding bar part having a transporting helical protruding bar for transporting the charging material from the inlet for the introduction to a side of the outlet;
a backing up helical protruding bar part having a backing up helical protruding bar for backing up the charging material to a side of the inlet by a backward transporting force less than a transporting force of the transporting helical protruding bar part; and
a stirring protruding bar part having a stirring protruding bar for stirring the charging material while scarcely transporting the charging material;
a driving part for rotating the rotor;
a steam feeding part for bringing the charging material into contact with heated steam; and
a cooler for cooling the cylinder part corresponding to a position of the backing up helical protruding bar part and the stirring protruding bar part.

2. An apparatus for removing a surface material from a resin product as defined in claim 1, wherein the steam feeding part comprises:
a means for generating a heated steam,
a steam-feed opening formed on the cylinder, and
a connecting tube for connecting between the means for generating heated steam and the steam-feed opening,
wherein the heated steam generated by the heated-steam generating means is fed into the cylinder through the connecting tube and the steam-feed opening to be brought into contact with the charging material.

3. An apparatus for removing a surface material from a resin product as defined in claim 1, further comprising:
a large number of openings formed on a portion of a bottom area of the cylinder and having a diameter smaller than that of the charging material.

4. An apparatus for removing a surface material from a resin product as defined in claim 1, wherein the rotor is provided with the transporting helical protruding bar part, the backing-up helical protruding bar part and the stirring protruding bar part, such that a plurality of each of the parts is provided in an axis direction of the cylinder.

5. An apparatus for removing a surface material from a resin product as defined in claim 1, wherein the rotor comprises at least one sequence of the transporting helical protruding bar part; the stirring protruding bar part; and the backing up helical protruding bar part, arranged sequentially in that order.

6. An apparatus for removing a surface material from a resin product as defined in claim 5, wherein the rotor comprises a plurality of said at least one sequence.

7. An apparatus for removing a surface material from a resin product as defined in claim 6, wherein said steam feeding part comprises, at a position corresponding to each transporting helical protruding bar part, at least one steam-feed opening which is formed in the cylinder.

8. An apparatus for removing a surface material from a resin product as defined in claim 1, wherein said steam feeding part comprises at least one steam-feed opening formed in the cylinder at a position corresponding to the transporting helical protruding bar part.

* * * * *